(12) United States Patent
Evitt (10) Patent No.: US 11,940,093 B2
(45) Date of Patent: Mar. 26, 2024

(54) BRACKETS

(71) Applicant: TECNA DISPLAYLIMITED, London (GB)

(72) Inventor: Jonathan Evitt, London (GB)

(73) Assignee: TECHNA DISPLAY LIMITED, London (GB)

( * ) Notice: Subject to any disclaimer, the term of this patent is extended or adjusted under 35 U.S.C. 154(b) by 105 days.

(21) Appl. No.: 17/785,046

(22) PCT Filed: Jul. 30, 2020

(86) PCT No.: PCT/GB2020/051821
§ 371 (c)(1),
(2) Date: Jun. 13, 2022

(87) PCT Pub. No.: WO2021/038188
PCT Pub. Date: Mar. 4, 2021

(65) Prior Publication Data
US 2023/0054447 A1 Feb. 23, 2023

(30) Foreign Application Priority Data

Aug. 28, 2019 (GB) ..................................... 1912370
Oct. 22, 2019 (GB) ..................................... 1915232

(51) Int. Cl.
*F16M 13/02* (2006.01)
*F16B 2/18* (2006.01)
*F16M 11/04* (2006.01)

(52) U.S. Cl.
CPC ........... *F16M 13/022* (2013.01); *F16B 2/185* (2013.01); *F16M 11/048* (2013.01)

(58) Field of Classification Search
CPC ...... F16M 13/022; F16M 11/048; F16B 2/185
See application file for complete search history.

(56) References Cited

U.S. PATENT DOCUMENTS 5,575,580 A * 11/1996 Parrish ................ E04H 17/1413
403/396
6,012,691 A 1/2000 Van Leeuwen et al.
(Continued)

FOREIGN PATENT DOCUMENTS

DE 102004026424 A1 6/2003
DE 20 2015 107018 U1 3/2017
(Continued)

OTHER PUBLICATIONS

International Search Report and Written Opinion dated Aug. 10, 2020 in connection with corresponding International Application No. PCT/US2020/051821.
(Continued)

*Primary Examiner* — Monica E Millner
(74) *Attorney, Agent, or Firm* — Stout, Uxa & Buyan, LLP; Donald E. Stout (57) ABSTRACT

A bracket (1) for mounting an object to a profiled beam (10), which includes a clamp (2) and a support (3) for adjustably securing the object relative to the profiled beam (10). The clamp (2) includes a pair of opposed clamp members (20, 21), a sprung hinge (4) connecting the clamp members (20, 21) together on a first of their sides and a fastener (5) for fastening the clamp members (20, 21) together on a second of their sides. Each clamp member (20, 21) describes a beam receiving recess (22) and includes a retaining lip (25) on the first side for engaging a profiled beam (10). The fastener (5) is operable to fasten the clamp members (20, 21) on the second side of the beam (10), while the retaining lips (25) engage the first side of the beam (10).

20 Claims, 7 Drawing Sheets

(56) References Cited

U.S. PATENT DOCUMENTS

| | | | |
|---|---|---|---|
| 7,922,145 B2* | 4/2011 | Martin | B28B 7/0032 |
| | | | 249/126 |
| 8,616,519 B2* | 12/2013 | Bacon | E04G 25/00 |
| | | | 249/18 |
| 9,683,380 B2* | 6/2017 | Brinkmann | E04G 1/12 |
| 2003/0075651 A1* | 4/2003 | Pedersen | B62J 7/08 |
| | | | 248/229.13 |
| 2006/0207208 A1 | 9/2006 | Chen | |
| 2006/0291951 A1 | 12/2006 | Van Zile, III et al. | |
| 2007/0137797 A1 | 6/2007 | Long et al. | |
| 2015/0286115 A1 | 10/2015 | Koch | |

FOREIGN PATENT DOCUMENTS

| | | |
|---|---|---|
| EP | 2 711 483 A1 | 3/2014 |
| EP | 2 921 719 A1 | 9/2015 |
| GB | 2480475 A | 11/2011 |
| WO | 2008062161 A1 | 5/2008 |

OTHER PUBLICATIONS

International Preliminary Report on Patentability dated Jan. 3, 2022 in connection with corresponding International Application No. PCT/US2020/051821.

Examination Report dated Jan. 20, 2023 by the UK Patent Office in connection with corresponding App. No. GB2204160.2.

\* cited by examiner

BRACKETS

This invention relates generally to brackets and more specifically to brackets for frames and the like. More specifically, although not exclusively, this invention relates to brackets and clamps for such brackets, which are intended for releasably engaging one or more beams of a frame or frame system. This invention is particularly concerned with brackets for supporting heavy objects on display frames or temporary structures of the kind which are formed of a plurality of support members, such as beams, joined together to form a three dimensional shape to which display panels are secured.

Brackets for engaging profiled support members of display frames are known. One application for such frames is display frames of the kind which are formed of a plurality of beams joined together to form a three dimensional shape to which display panels are secured. Known display frames of this type include multi-way node fittings to provide modular assemblies that are easy to assemble and disassemble. One such display system is described in WO2008062161 by the present applicant. The beams of this display system include slots formed by lips extending from each corner edge of the beam.

GB2480475 describes a support bracket for use in a display frame of the kind described in WO2008062161. The support bracket includes a body with a socket or receptacle for receiving a resilient plug, a knob with a threaded hole and a flange member with a threaded shaft and a flange plate at one end of the shaft. The shaft of the flange member extends through a hole in the body and engages the threaded hole of the knob. A spring surrounds the shaft of the flange member and is compressed between the flange plate and the knob to preload the threaded engagement between the shaft and the knob. This preload causes the flange member to rotate with the knob until the flange plate engages lips of a beam, at which point continued rotation of the knob draws the flange plate toward the body and captivates or clamps the lips between the flange plate and the body to secure the support bracket to the beam.

The support bracket described in GB2480475 is effective for releasably securing various features to the beam, such as flags or banner support poles, which are received within the socket or receptacle of the bracket described. However, it is becoming increasingly popular to mount larger objects to display frames, for example large computer monitors and the like. The strength of the clamping mechanism of GB2480475 is insufficient to support such objects.

It would therefore be advantageous to provide a bracket that mitigates this issue. It would also be advantageous to provide an improved and/or more versatile bracket and associated clamping mechanism, preferably one that is easier to use.

Accordingly, a first aspect of the invention provides a bracket for mounting an object to a profiled beam, the bracket comprising a pair of opposed clamp members, a fastener for fastening the clamp members and mounting means for mounting an object to one of the clamp members, wherein the clamp members describe opposed beam receiving recesses, each clamp member has a retaining feature for engaging a first side of a profiled beam and the fastener is operable to fasten the clamp members on a second side of the beam, opposite the first side, while the retaining features engage the first side of the beam.

Another aspect of the invention provides a clamp, e.g. for use in a bracket such as that described above, the clamp comprising a pair of opposed clamp members and a fastener for fastening the clamp members, wherein the clamp members describe opposed beam receiving recesses, each clamp member has a retaining feature for engaging a first side of a profiled beam and the fastener is operable to fasten the clamp members on a second side of the beam, opposite the first side, while the retaining features engage the first side of the beam.

The provision of retaining features that engage the clamp members with one side of the beam, and a fastener that fastens them on its other side, provides a more effective clamp and simplifies the construction of the bracket. More specifically, the clamping force applied by the fastener reinforces the engagement between the retaining features and the profile of the beam.

Each retaining feature may comprise a retaining recess, slot, hole, ledge, projection or lip. The retaining feature may project from or into the clamp member. The retaining feature may project inwardly from the clamp member. The retaining feature may be for engaging a lip, projection, ledge, hole, slot or recess on, in or of the profiled beam.

The fastener may comprise a threaded fastener and/or fixing nut, snap fit connector, twist lock, clasp, catch or latch. The latch may comprise a twist lock latch. The fastener may be operable to screw, connect, catch or latch the clamp members, e.g. together or to one another. The fastener may be operable to draw the clamp members toward one another and/or to cause the clamp members to exert a closing force on the beam. At least one or each of the clamp members may comprise a resilient or adjustable grip means or gripper, e.g. for maintaining or adjusting the closing force, such as in order to compensate for minor variations in beam dimensions. The resilient grip means or gripper may comprise one or more resilient elements or pads, which may be mounted to one or each clamp member. The resilient grip means or gripper may be formed of a foam material or an elastomeric material, such as natural or synthetic rubber. The adjustable grip means or gripper may be provided by a threaded fastener or an adjustable latching mechanism.

The twist lock or twist lock latch may comprise a knob, which may be rotatably mounted to a first of the clamp members. The twist lock or twist lock latch may be operable to releasably engage a second of the clamp members. The second clamp member may comprise a catch, which may be described by an L-shaped projection or a necked head projecting from the second clamp member. The first clamp member or knob may comprise a cam, which may be integral therewith or mounted thereto and/or may cooperate with the second clamp member or the catch thereof. The second clamp member or the catch thereof may comprise a cam, which may be integral therewith or mounted thereto and/or may cooperate with the knob or cam of the first clamp member.

The cam(s) may be configured to draw the clamp members toward one another, for example upon rotation of the knob, e.g. in a first direction. The cam(s) may be configured to release, unclamp or loosen the clamp members from one another, for example upon rotation of the knob, e.g. in a second direction, which may be opposite the first direction. The knob may comprise a grip means, for example one or more projections or a peripheral grip means or surface. The knob may be substantially cylindrical. The grip means may comprise one or more, e.g. a pair of, axial projections, which may extend radially and/or enable a torque to be applied to the knob.

The clasp, catch or latch comprises a toggle clasp, catch or latch. The fastener may be configured to adjust the space between the clamp members, e.g. on the second side of the beam. The clasp, catch or latch may comprise a claw or loop, which may be connected or mounted, e.g. movably or pivotally connected or mounted, to one of the clamp members. The clasp, catch or latch may comprise a catch member or hook, which may be connected, mounted or secured to one of, e.g. the other of, the clamp members. The claw or loop may releasably engage the catch member or hook.

The fastener may be movable or adjustable between a fastened position or condition and an unfastened position or condition. The fastened position or condition may comprise a connected, clasped or latched position or condition. The unfastened position or condition may comprise a disconnected, unclasped or unlatched position or condition. The fastener may be configured or operable to retain the clamp members together, e.g. in the unfastened, unclasped or unlatched position or condition. Additionally or alternatively, the fastener may releasably connect the clamp members together. The fastener may be configured or operable to release the clamp members from one another, e.g. in the unfastened, disconnected, unclasped or unlatched position or condition.

The bracket or clamp may comprise a tether, which may join the clamp members, e.g. on the first side of the beam. The tether may be configured to support the clamp members, for example in a spaced and/or beam receiving configuration. The tether may be stiff or rigid. The tether may be resilient, for example to enable the clamp members to be moved relative to one another. The tether may be configured to urge the clamp members apart and/or to retain them in a spaced relationship. The tether may comprise a hinge, which may be sprung. The tether may comprise or be formed from a plate or plate material, e.g. a metallic plate or plate material. The tether may comprise or be formed from a plastics material or any suitable combination of materials. In some examples, the tether comprises a line, such as a chain, string, thread or elongate and/or thin line of resilient or malleable material.

The mounting means may comprise a support, which may be mounted, secured or connected to the clamp member. The bracket may comprise a further mounting means or support, which may be mounted, secured or connected to the other clamp member. Each clamp member may comprise a mounting means or support, which may be mounted, secured or connected to the clamp member. The or each mounting means or support may comprise a mounting bracket, which may be mounted, secured or connected to the clamp member. The or each mounting bracket may be configured to mount, secure or connect the mounting means or support to the clamp member.

The or each mounting means or support may comprise a connector, e.g. for connecting an object to the clamp member. The or each mounting means or support may be mounted, secured or connected to the clamp member at one, e.g. a first, of its ends. The or each mounting means or support may comprise a connector at one, e.g. the other or a second, of its ends. The or each support may comprises an elongate member.

The or each mounting means or support may be adjustable or extendable and/or retractable, e.g. for adjustably mounting the object to the clamp member. The or each support may comprise telescopic members, e.g. first and second telescopic members. The or each support may comprise three or more telescopic members. At least one or each telescopic member may be tubular. The telescopic members may comprise nested tubular members. One of the telescopic members, e.g. the first telescopic member, may be secured to the clamp member, e.g. by the mounting bracket. One of the telescopic members, e.g. the other or second telescopic member, may comprise a connector, e.g. for connecting to an object.

The or each extendable support may comprise a fixing means, such as a retainer or clamp. The retainer may comprise a grub screw, hole and removable pin or ball and detent mechanism. The clamp of the extendable support may be for releasably securing the telescopic members to one another, for example in any one of a plurality of relative positions. The or each extendable support, e.g. the clamp thereof, may comprise one or more, e.g. a plurality of, tabs. The tab(s) may extend from one of the telescopic members. The or each extendable support, e.g. the clamp thereof, may comprise a sleeve, e.g. an inner sleeve, which may comprise the tab(s).

The or each extendable support, e.g. the clamp thereof, may comprise a sleeve, e.g. an outer sleeve. The sleeve or outer sleeve may surround the tabs. The sleeve or outer sleeve may be rotatable, e.g. relative to the tabs, to urge the tabs against the other of the telescopic members. The sleeve or outer sleeve may comprise one or more cams, which may urge the tabs against the other of the telescopic members. Rotation of the sleeve or outer sleeve may cause the cam(s) to urge the tabs against the other of the telescopic members. The sleeve or outer sleeve may threadedly engage the inner sleeve or one of the tubular supports and/or the cam(s) may comprise or be provided by a tapered portion of the sleeve or outer sleeve.

The connector of the or each mounting means or support may be removably connected or secured thereto, e.g. by a threaded connection or some other suitable securing means. The or at least one connector may comprise a key, e.g. for engaging a keyway of an object. The or at least one connector or key may comprise a snap-fit, threaded or bayonet fitting. The or at least one connector, or the support or telescopic member to which it is attached, may be movable, removable or reconfigurable, for example between a first or connected or locked position or condition and a second or disconnected or unlocked position or condition. The key may be configured to be engaged with and/or retained by a keyway of an object in the first position or condition and/or may be removable from or insertable into a keyway of an object in the second position or condition.

The or at least one connector may comprise a plate or a plate connector. The plate connector may comprise a plate or connection plate. The plate or connection plate may comprise one or more, such as two or more, e.g. an array of, fastening features. The fastening features may comprise holes, which may be threaded or smooth, or threaded shafts or any other suitable fastening features. The fastening features may be for connection with an edge or corner, e.g. a respective edge or corner, of an object, e.g. a respective object.

The plate may be substantially polygonal, e.g. substantially rectangular, and/or may comprise a fastening feature at or adjacent each of its corners. The plate may have rounded and/or scalloped corners. The fastening features may comprise one or more holes, which may be elongated, e.g. slot(s). The plate connector may comprise a connection means, e.g. a threaded spigot or shaft, for connecting to the mounting means or support.

Another aspect of the invention provides a kit of parts for assembly into a clamp or bracket, e.g. as described above, or into a frame or frame system. The kit may comprise a pair of clamp members and a fastener, e.g. as described above. The kit may comprise a clamp, e.g. as described above. The kit may comprise one or more extendable support(s), e.g. for adjustably mounting one or more object(s) to the clamp. The kit may comprise any one or more components or features described above in relation to the bracket or clamp.

Another aspect of the invention provides a method of mounting an object to a profiled beam, the method comprising mounting a pair of clamp members on opposite sides of a profiled beam such that the beam is received within a recess in each clamp member and such that a retaining feature of each clamp member is engaged with a first side of the beam and fastening the clamp members together on a second side of the beam, opposite the first side, while the retaining features engage the first side of the beam.

Mounting the clamp members on opposite sides of the profiled beam may comprise engaging a recess, slot, hole, ledge, projection or lip of each clamp member with a lip, projection, ledge, hole, slot or recess on, in or of the profiled beam. Fastening the clamp members together on the second side of the beam may cause the retaining features to brace against the beam.

Fastening the clamp members together may comprise screwing, connecting, catching or latching the clamp members together. Fastening the clamp members together may comprise operating or rotating a twist lock or twist lock latch. Fastening the clamp members together may comprise clasping, catching or latching a toggle clasp, catch or latch. Fastening the clamp members together may comprise adjusting the space between the clamp members, e.g. on the second side of the beam. Fastening the clamp members together may comprise engaging a claw or loop on or of one of the clamp members with a catch member or hook on or of the other clamp member. Fastening the clamp members together may comprise moving a toggle or toggle member to draw the claw or loop toward the clamp member to which it is connected or mounted, e.g. whilst the claw or loop is engaged with the catch member or hook. Drawing the claw or loop toward the clamp member to which it is connected or mounted may draw the clamp members together.

The method may comprise mounting an object, such a computer monitor, to the profiled beam. The mounting of the object may comprise mounting the object to mounting means mounted or connected to one of the clamp members. The mounting of the object may comprise adjusting or extending or retracting the mounting means, which may be or comprise a support such as telescopic members. The adjusting or extending or retracting the mounting means may be performed to create an angled or substantially concave or convex wall or wall portion, e.g. formed of a plurality of mounted objects. The mounting of the object may comprise securing the support in an adjusted position. The mounting of the object may comprise moving or rotating a connector, e.g. a key, of the mounting means or support relative to a connector, e.g. a keyway in, the object, for example from a disconnected or unlocked position or condition to a connected or locked position or condition.

For the avoidance of doubt, any of the features described herein apply equally to any aspect of the invention. For example, the bracket may comprise any one or more features of the clamp relevant thereto and/or the method may comprise any one or more features or steps relevant to one or more features of the bracket, clamp or kit.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of any one or more components of the bracket, clamp or kit described above.

A yet further aspect of the invention provides the computer program element embodied on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Embodiments of the invention will now be described by way of example only with reference to the accompanying drawings in which.

Figure 1:
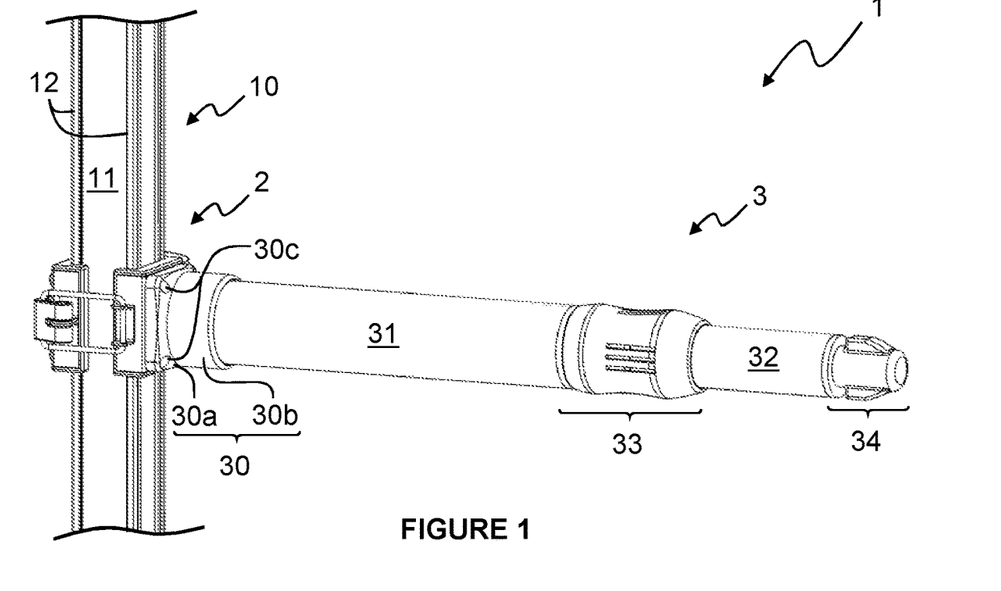
FIG. 1 is a perspective view of a bracket according to an example of the invention, which is clamped to a profiled beam of a display frame or temporary structure.

Referring now to FIG. 1, there is shown a bracket 1 for mounting an object, such as a computer monitor (not shown), to a profiled beam 10. The bracket 1 includes a clamp 2 and a support 3, which is adjustable in this example to provide a mounting means for adjustably securing the object (not shown) relative to the profiled beam 10. The profiled beam 10 in this example has a substantially square cross-section with a slot 11 along each of its longitudinal faces. The slots 11 are described between flanges 12 extending along each corner of the beam 10. In use, the profiled beam 10 is incorporated in a display frame or temporary structure of the kind that is formed of a plurality of such beams 10, joined together to form a three dimensional structure to which display panels and other objects (such as computer monitors and the like) are secured.

As illustrated more clearly in FIGS. 2 to 5, the clamp 2 includes a pair of opposed clamp members 20, 21, a sprung hinge 4 connecting the clamp members 20, 21 together on a first of their sides and a fastener 5 for fastening the clamp members 20, 21 together on a second of their sides, opposite the first side. Each clamp member 20, 21 is in the form of a channel section, which is square in plan with a beam receiving recess 22 on an inner side. The recess 22 of each clamp members 20, 21 is described by a pair of flanges 23, 24 extending along opposite sides thereof. One flange 24 includes a retaining lip 25, which projects inwardly of the clamp member 20, 21. In this example, the lip 25 extends into the recess 22, but this need not be the case, for example if the other flange 23 is shallower than the flange 24 with the lip 25. Each clamp member 20, 21 also includes threaded holes 26 on its outer side, adjacent each corner.

The support 3 includes a mounting bracket 30, a pair of telescopic tubes 31, 32, a tube clamp 33 and a key connector 34. The mounting bracket 30 includes a mounting plate 30a and an internally threaded tubular receptacle 30b. The mounting plate 30a includes four holes 30c through its thickness, which correspond to the threaded holes 26 of one of the clamp members 21. As illustrated more clearly in FIG. 6, the first telescopic tube 31 includes a first, externally threaded end 31a and a second, internally threaded end 31b. The first end 31a is received within the receptacle 30b of the mounting bracket 30 and threadedly engaged therewith. The second telescopic tube 32 includes a first end 32a, which receives a plug 35, and a second, internally threaded end 32b.

Figures 6, 7, 8, 9:
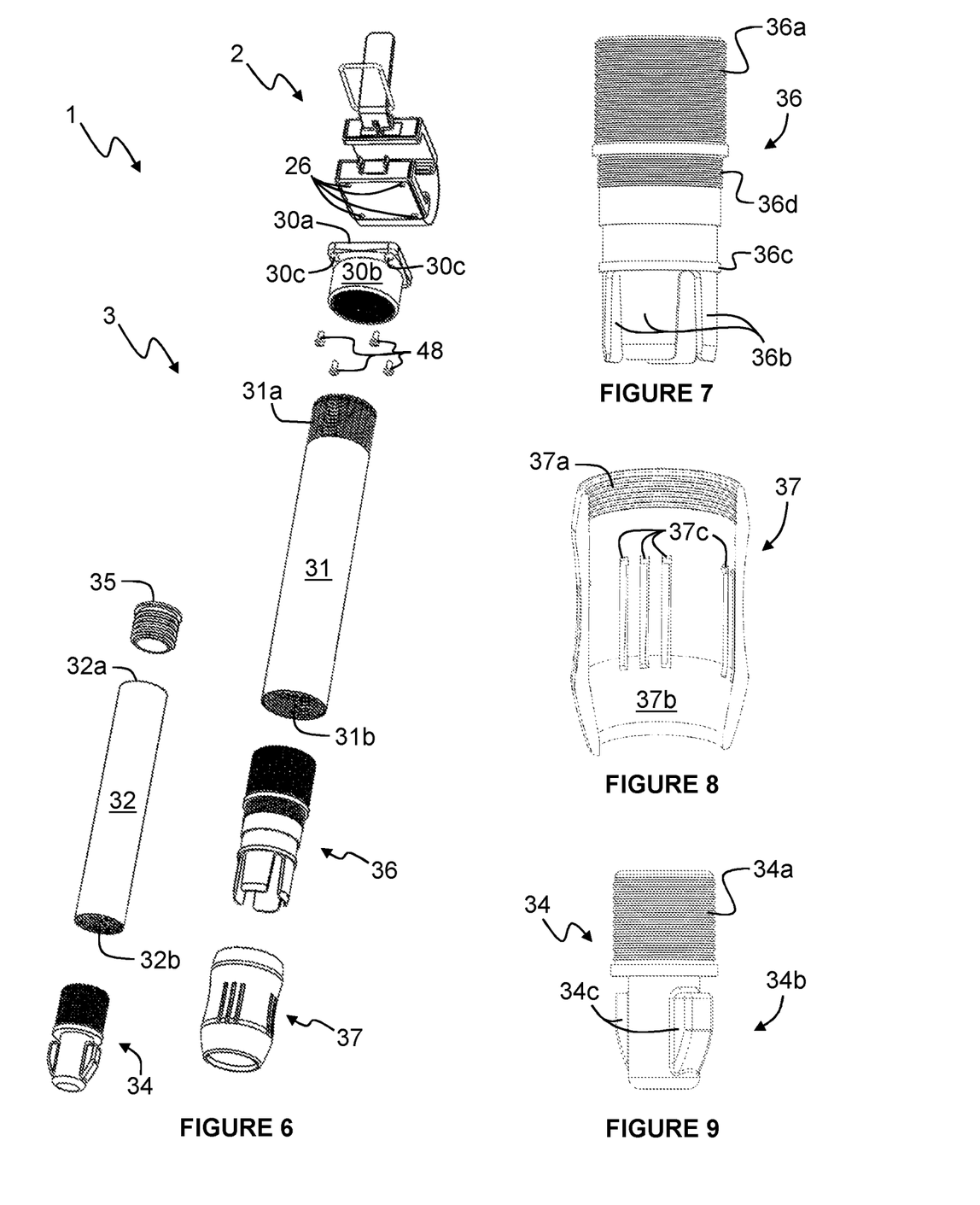
FIG. 6 is an exploded perspective view of the bracket of FIGS. 1 to 4.
FIG. 7 is a side view of the inner sleeve of the tubular clamp of the support of the bracket of FIGS. 1 to 5.
FIG. 8 is a perspective section view of the outer sleeve of the tubular clamp of the support of the bracket of FIGS. 1 to 5.
FIG. 9 is a side view of the end connector of the support of the bracket of FIGS. 1 to 5.

The tube clamp 33 includes an inner sleeve 36 and an outer sleeve 37. The inner sleeve 36 includes a first, externally threaded end 36a, four spaced, axial tabs 36b extending from a radial flange 36c and forming a second end, opposite the first end 36a, and an intermediate thread 36d between threaded first end 36a and the radial flange 36c. The outer sleeve 37 includes a first, internally threaded end 37a, a second, tapered end 37b and a series of spaced, tapered projections 37c.

The first end 36a of the inner sleeve 36 is received within, and threadedly engages, the second end 31b of the first telescopic tube 31 and slidingly receives the first end 32a of the second telescopic tube 32. The outer sleeve 37 surrounds the inner sleeve 36, with the first end 37a engaging the intermediate thread 36d of the inner sleeve 36 and the tapered projections 37c cooperating with the radial flange 36c to retain the outer sleeve 37 on the inner sleeve 36.

The key connector 34 includes a first, externally threaded end 34a and a second, keyed end 34b. The keyed end 34b in this embodiment includes a pair of opposed tapered projections 34c. The keyed end 34b is configured to be received within a keyway (not shown) in the object (not shown) in a first orientation, and rotated within the keyway (not shown) to a second orientation in which the projections 34c engage the keyway (not shown) to secure the object (not shown) to the support 3.

Figure 2:
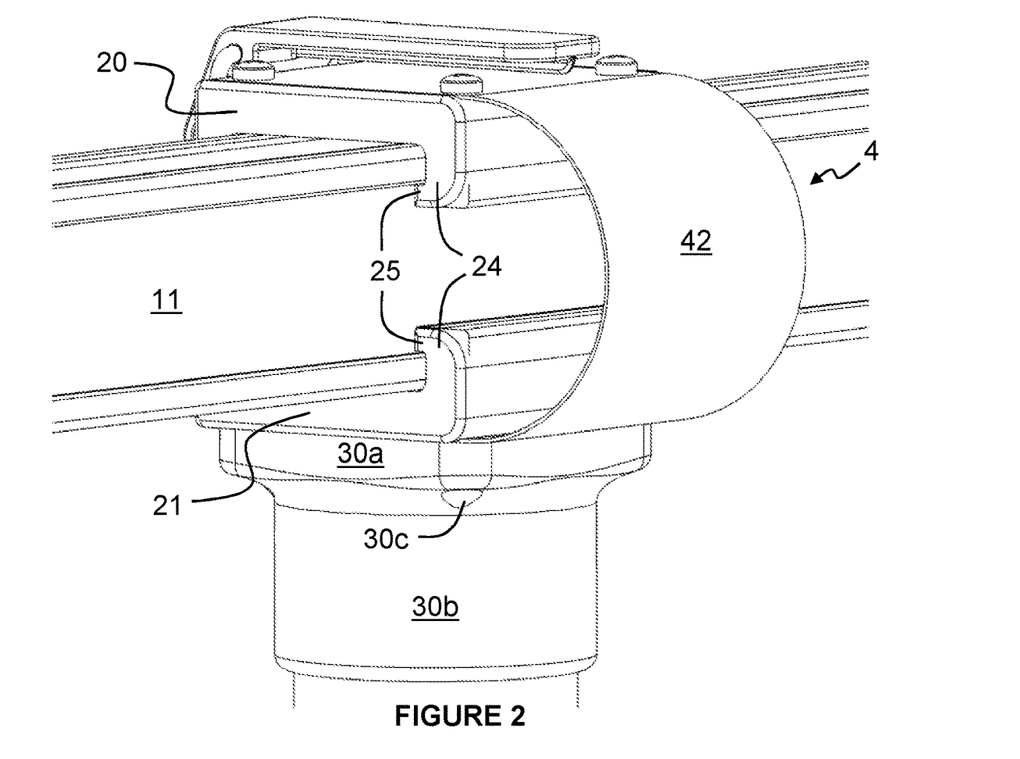
FIG. 2 is an enlarged perspective view of the clamp of the bracket of FIG. 1, illustrating the sprung hinge.
Figure 5:
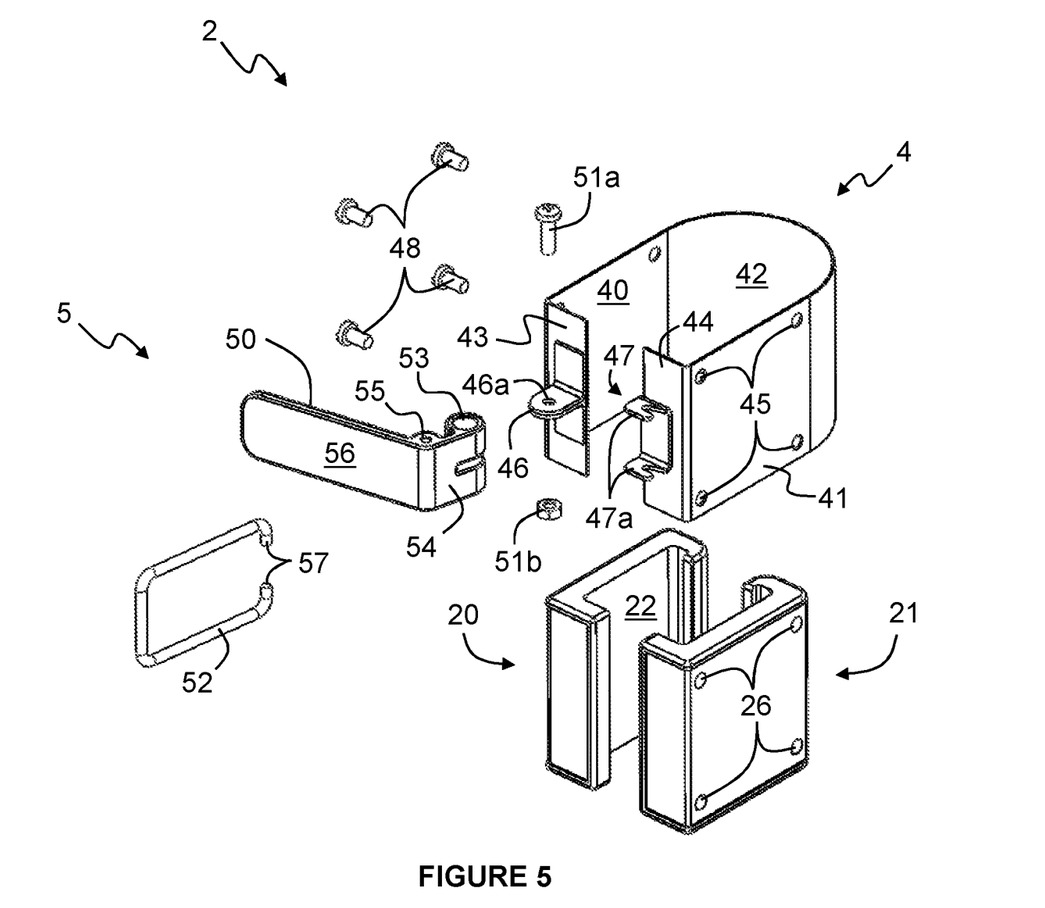
FIG. 5 is an exploded perspective view of the clamp of FIG. 4.

The sprung hinge 4, shown more clearly in FIGS. 2 and 5, is formed of a metallic plate, such as stainless steel, shaped into a U with a pair of parallel plate portions 40, 41 interconnected by a curved portion 42 and opposed flanges 43, 44 at the free ends of the plate portions 40, 41 which project toward one another. Each plate portion 40, 41 includes four holes 45 through its thickness, which correspond to the threaded holes 26 of the clamp members 20, 21. Each flange 43, 44 includes a respective bracket 46, 47 extending outwardly therefrom. A first bracket 46 includes a hole 46a extending parallel to the beam 10 and a second bracket 47 provides a pair of spaced hooks 47a opening outwardly with respect to the other bracket 46.

In this example, the fastener 5 is in the form of a toggle latch 5 that releasably connects the clamp members 20, 21 together. The latch 5 includes a lever 50 hingedly connected to the first bracket 46 by a pin 51 and a connection loop 52 pivotally mounted to the lever 50. The lever 50 is substantially L-shaped with a pin receptacle 53 at the free end of a short leg 54 thereof and a loop receptacle 55 at the junction between the short leg 54 and a long leg 56 of the lever 50. The pin 51 includes a bolt 51a, which threadedly engages a hexagonal nut 51b. The connection loop 52 is formed of a length of metal wire, bent to form a substantially C-shaped loop with opposed free ends 57 projecting toward one another.

Figure 3:
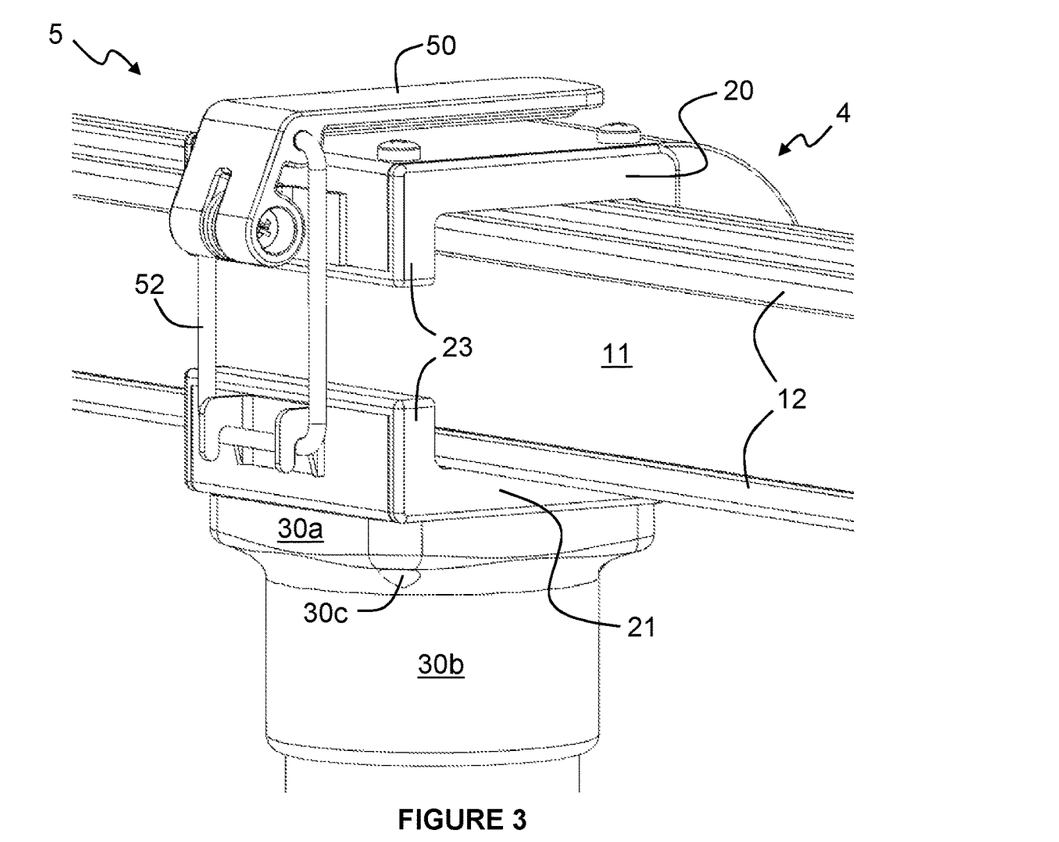
FIG. 3 is an enlarged perspective view similar to that of FIG. 2, but illustrating the latch mechanism.
Figure 4:
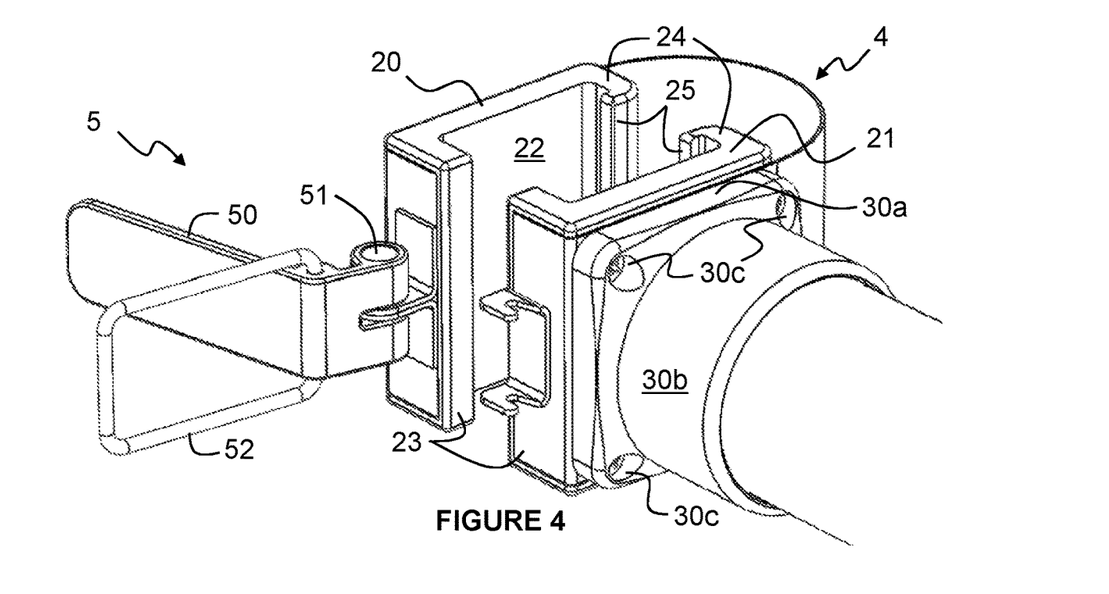
FIG. 4 is a perspective view of the clamp shown in FIGS. 2 and 3 with the beam omitted and with the latch shown in an unlatched configuration.

In the assembled condition, shown more clearly in FIGS. 2 to 4, the sprung hinge 4 is secured to the clamp member 20, 21 by screws 48. The screws 48 extend through the holes 45 through the plate portion 40, 41 and engage the threaded holes 26 of the clamp members 20, 21. However, the screws 48 that extend through the holes 45 of the plate portion 41 from which the second bracket 47 projects also extend through the mounting plate holes 30c, thereby securing the mounting plate 30a to the adjacent clamp member 21.

The pin 51 is received within the pin receptacle 53 and through the hole 46a in the first bracket 46 to pivotally mount the lever 50 to the adjacent clamp member 20. The free ends 57 of the connection loop 52 are received within opposite sides of the loop receptacle 54 to pivotally mount the connection loop 52 to the lever 50. In this condition, the lever 50 may be pivoted toward the other clamp member 21 to enable the connection loop 52 to be inserted into the hooks 47a. With the connection loop 52 engaged within the hooks 47a, the lever 50 may be pivoted back, way from the other clamp member 21 to toggle the latch 5 to a latched condition, as illustrated in FIG. 3.

In order to mount the clamp 2 onto the profiled beam 10, the latch 5 is in the unlatched condition, as shown in FIG. 4, the clamp members 20, 21 are urged apart and placed over one side of the profiled beam 10. The retaining lips 25 of the clamp 2 are urged into the adjacent slot 11 of the beam 10 until the opposite flanges 23 pass over the adjacent corner flanges 12 of the beam 10. In this example, the clamp members 20, 21 are shaped and configured such that they snap into engagement over the beam 10 at this point, by virtue of the sprung hinge 4. The latch 5 is then latched by engaging the connection loop 52 into the hooks 47a and pivoting the lever 50 to the latched condition, as described above. In this, latched condition, the clamp members 20, 21 exert a closing and clamping force on the beam 10 to retain the bracket 1 in position.

In use, the second telescopic tube 32 is rotated in order to rotate the key connector 34 for engaging the keyway (not shown). The outer sleeve 37 is then rotated relative to the inner sleeve 36, which draws it toward the first telescopic tube 31 such that the second, tapered end 37b engages the tabs 36b of the inner sleeve 36. Continued rotation of the outer sleeve 37 relative to the inner sleeve 36 and urges them against the second telescopic tube 32. As a result, the tabs 36b clamp the second telescopic tube 32 in place relative to the first telescopic tube 31. The second, tapered end 37b therefore acts as a cam surface which engages the tabs 36b to clamp the second telescopic tube 32.

Referring now to FIGS. 10 to 13, there is shown a bracket 101 according to another example, which is similar to the bracket 1 described above, wherein like features are labelled with like references incremented by 100. The bracket 101 according to this example differs from that described above in that the toggle latch fastener 5 is replaced with a twist lock latching fastener 105, the bracket 101 includes a second telescopic support 103' and one of the supports 103, 103' includes a plate connector 138 in place of the key connector 134.

Figure 12:
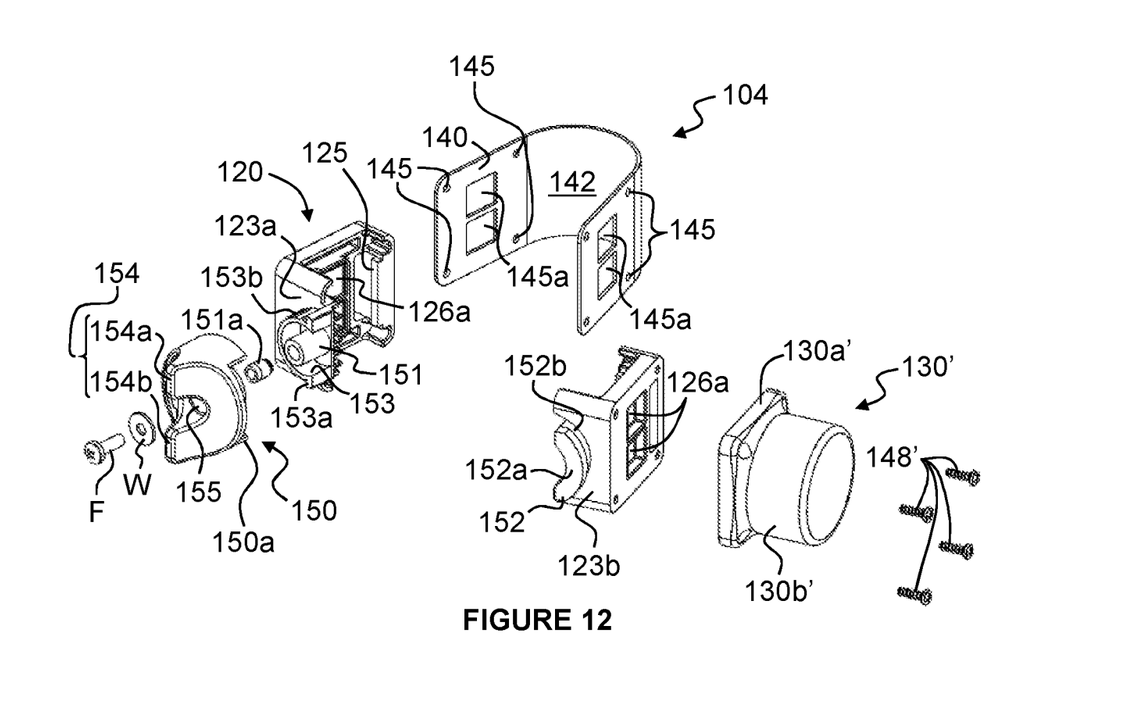
FIG. 12 is an exploded perspective view of the clamp of the bracket of FIGS. 10 and 11.

The twist lock latching fastener 105 includes a knob 150, which is rotatably mounted to a hub 151 projecting from the flange 123a on one side of the first clamp member 120, and a catch 152 projecting from the flange 123b on the adjacent side of the second clamp member 121. The hub 151 is surrounded by a part-circular ratchet wall 153 having a stop 153a at each of its ends and a plurality of splines 153b projecting radially from the ratchet wall 153, between the stops 153a. The knob 150 includes corresponding splines (not shown) which cooperate with the splines 153b of the ratchet wall 153 to provide a step-wise adjustment mechanism. The stops 153a limit the extent of movement of the knob 150 relative to the hub 151.

The knob 150 has a substantially cylindrical body with a central ridge 154 projecting from its free end with a gradual, curved transition to the cylindrical body. The knob 150 also includes a central, axial hole 155, which divides the central ridge 154 into a pair of gripping tabs 154a, 154b for applying a torque to the knob 150. The hub 151 receives a threaded insert 151a and the knob 150 is secured thereto by a threaded fastener F. The threaded fastener F extends through a washer W, through the hole 155 of the knob 150 and into the threaded insert 151a in the hub 151.

The catch 152 is a part-annular projection with a head portion 152a and a necked portion 152b, thereby providing an L-shaped radial cross-section. The knob 150 also includes a part-annular portion 150a depending from the cylindrical body, which is also L-shaped to engage with the catch 152. The part-annular portion 150a of the knob 150 and the necked portion 152b of the catch include engaging circumferential camming surfaces having a radial dimension that vary to increase the interference therebetween along a clockwise direction. Thus, rotation of the knob 150 in the clockwise direction draws the catch 152, and therefore the second clamp member 121, toward the first clamp member 120. As explained above, the cooperating splines 153b of the ratchet wall 153 and knob 150 provide a step-wise adjustment mechanism.

Each of the clamp members 120, 121 includes a pair of square sockets 126a which receive square dowel projections 130d on the facing surface of the mounting bracket 130, 130' of one of the supports 103, 103'. Similarly, each of the plate portions 140, 141 of the sprung hinge 104 includes a corresponding pair of square holes 145a through its thickness, which are aligned with the square sockets 126a of the clamp member 120, 121 to which it is mounted. As the hub 151 and catch 152 are both formed as part of the clamp members 120, 121, the flanges 43, 44 of the previous example are omitted from the sprung hinge 104 in this example. When the mounting brackets 130, 130' of the supports 103, 103' are mounted to the clamp members 120, 121 with the plate portions 140, 141 of the sprung hinge 104 captivated therebetween, the square dowel projections 130d extend through the square holes 145a and into the square sockets 126a. This arrangement improves the overall rigidity of the bracket 101.

Figure 13:
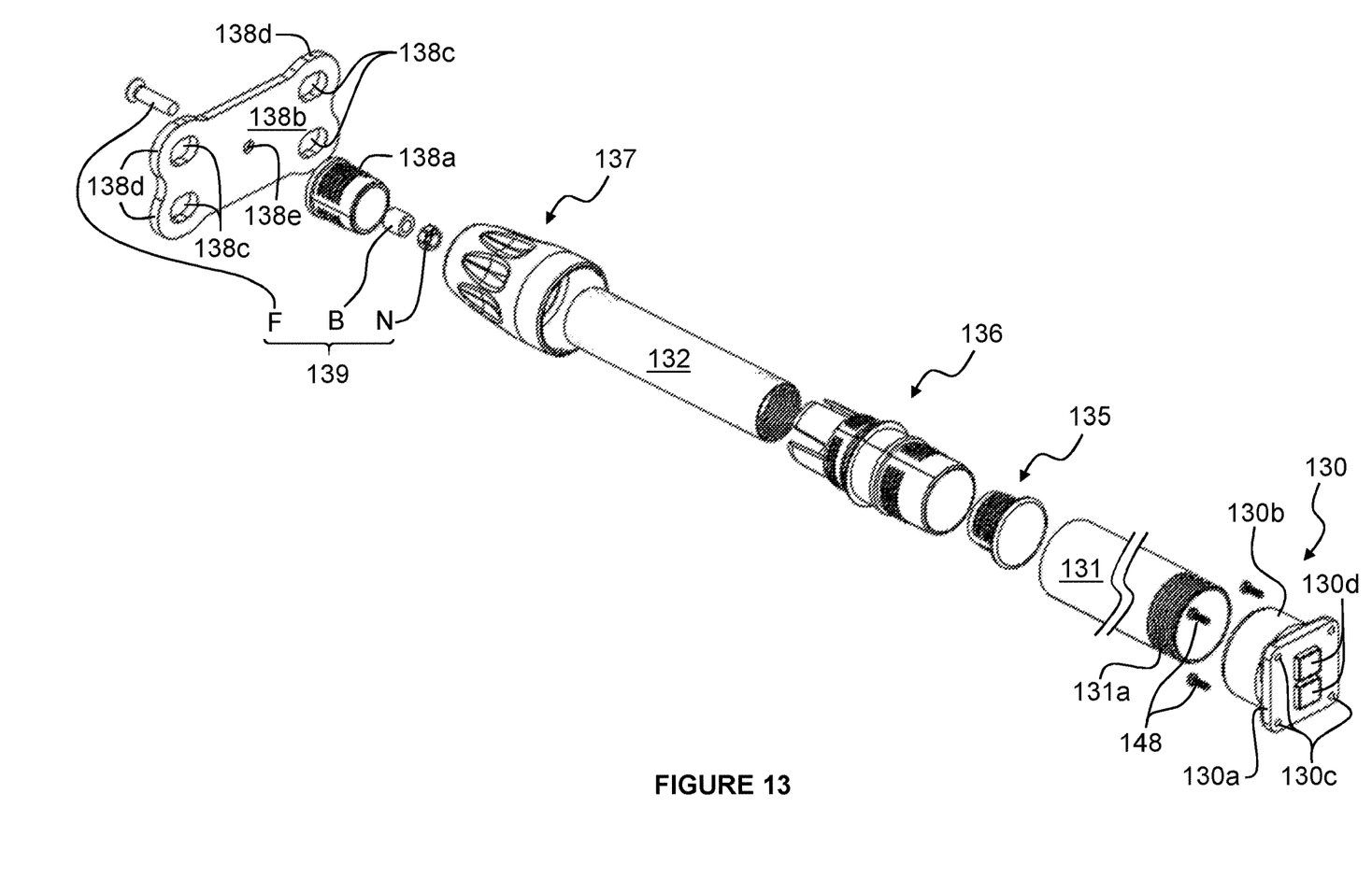
FIG. 13 is an exploded perspective view of one of the supports of the bracket of FIGS. 10 and 11.

The key connector 134 in this example is substantially the same as the key connector 34 in the example described above, except that much of the solid material thereof has been replaced by reinforcing ribs. The plate connector 138 includes a threaded tubular fitting 138a with a closed end, a plate 138b and a fastening assembly 139 securing the plate 138b to the closed end of the tubular fitting 138a. The key connector 134 and the plate connector 138 are each removably securable to one of the telescopic supports 103, 103'.

The plate 138b is substantially rectangular in plan with four holes 138c, one adjacent each of its corners 138d, and a central mounting hole 138e. The corner holes 138c are elongated along the longer dimension of the rectangular plate 138b and the corners 138d are scalloped to follow the profile of the holes 138c. The fastening assembly 139 includes a threaded fastener F, a bushing B and a nut N. In the assembled condition, the fastener F extends through the central mounting hole 138e of the plate 138b, through a hole (not shown) in the closed end of the tubular fitting 138a, through the bushing B and threadedly engaging the nut N. The fastening assembly 139 is configured to rotatably connect the plate 138b to the telescopic support 103, thereby to enable its orientation to be adjusted.

Figure 10:
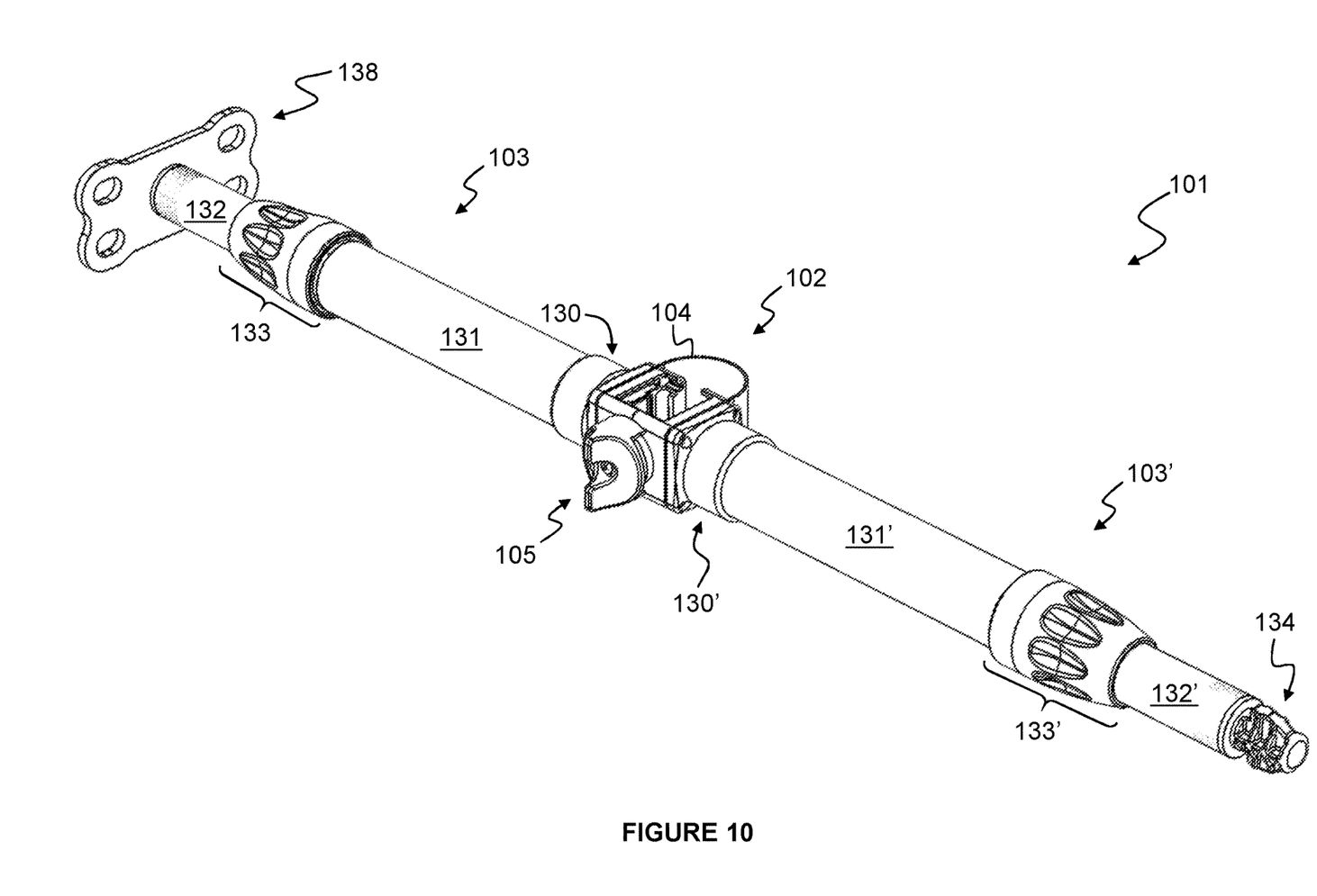
FIG. 10 is a perspective view of a bracket according to another example, which includes two extendable supports.
Figure 11:
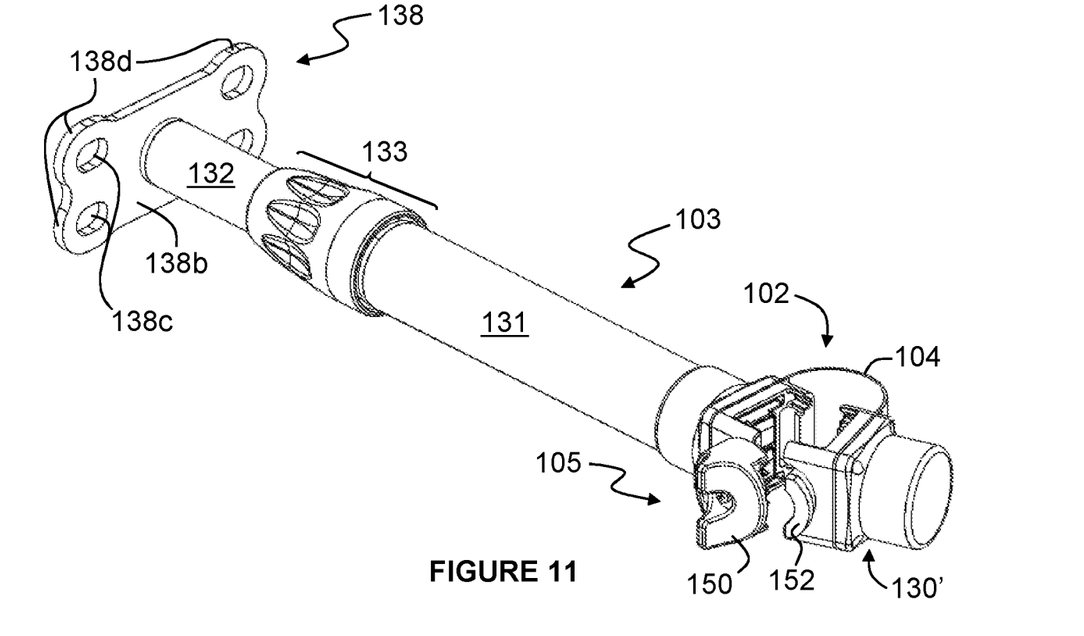
FIG. 11 is a view similar to that of FIG. 10, but with one of the supports omitted and showing the twist lock latch in an unlatched configuration.

The bracket 101 according to this example enables objects, such as large computer monitors (not shown), to be mounted on opposed sides of the profiled beam 10. This can be particularly useful in situations where a temporary structure (not shown) incorporates a wall having computer monitors (not shown) mounted on each of its sides.

Typically, such temporary structures (not shown) are configured to support the computer monitors (not shown) vertically along the plane of the monitors. The brackets 1, 101 of the invention provide a convenient means of securing laterally the computer monitors (not shown) relative to the temporary structure (not shown), thereby to prevent them from falling from the structure.

The use of a plate connector 138 as described above also enables the corners of such computer monitors (not shown) to be aligned with one another, thereby improving the aesthetics of the wall of computer monitors (not shown). In addition, the telescopic adjustability of the brackets 1, 101 also facilitates small changes to the relative orientation of adjacent computer monitors (not shown), for example to create a slightly concave or convex wall. The connectors 34, 134, 138 are all removable from the telescopic support 3, 103, thereby providing a versatile, adaptable bracket 1, 101.

Moreover, the bracket 101 according to the second example need not be used with two telescopic supports 103. It could be used, for example, in the form shown in FIG. 11, with the mounting bracket 130' of the second telescopic support 103' mounted to the second clamp member 121, but without the other components thereof.

It will be appreciated by those skilled in the art that several variations to the aforementioned embodiments are envisaged without departing from the scope of the invention. For example, the shape of the opposed beam receiving recesses 22 of the clamp members 20, 21 may vary to accommodate beams 10 having a different cross-sectional shape, such as round, elliptical or any other shape. The support 3 may have a different configuration and need not be adjustable. The clamp 2 may be used with any suitable mounting means or may form part of the object (not shown) to be clamped.

Moreover, one or both clamp members 20, 21 may include a resilient or adjustable grip means for maintaining or adjusting the closing force to compensate for minor variations in beam dimensions. The grip means may be provided by resilient pads mounted to the clamp members 20, 21 or the latch 5 may be made adjustable or be replaced by a threaded fastener.

It will also be appreciated by those skilled in the art that any number of combinations of the aforementioned features and/or those shown in the appended drawings provide clear advantages over the prior art and are therefore within the scope of the invention described herein.

The invention claimed is:

1. A bracket for mounting an object to a profiled beam, the bracket comprising a pair of opposed clamp members, a tether joining the clamp members, a fastener for fastening the clamp members and a support for adjustably mounting the object to one of the clamp members, wherein the clamp members include opposed beam receiving recesses, each clamp member has a retaining feature for engaging a first side of the profiled beam, the tether joins the clamp members on the first side of the beam and the fastener is operable to fasten the clamp members on a second side of the beam, opposite the first side, while the retaining features engage the first side of the beam.

2. A bracket according to claim 1, wherein each retaining feature comprises a retaining lip which projects inwardly from the clamp member for engaging a lip or recess of the profiled beam.

3. A bracket according to claim 2, wherein the fastener comprises a latch operable to latch the clamp members together, thereby to cause them to exert a closing force on the beam.

4. A bracket according to claim 3, wherein the latch comprises a twist lock latch which releasably connects the clamp members together.

5. A bracket according to claim 1, wherein the tether is configured to support the clamp members in a spaced, beam receiving configuration and is resilient to enable the clamp members to be moved relative to one another.

6. A bracket according to claim 5, wherein the tether comprises a sprung hinge.

7. A bracket according to claim 1 wherein the tether is formed from a metallic plate.

8. A bracket according to claim 1, wherein the support comprises an extendable support for adjustably mounting the object to the clamp member.

9. A bracket according to claim 8 comprising an extendable support secured to each clamp member for adjustably mounting an object to each clamp member.

10. A bracket according to claim 8, wherein the or each extendable support comprises first and second telescopic members, one of which is secured to the clamp member and the other of which comprises a connector for connecting to the object.

11. A bracket according to claim 10, wherein the or each extendable support comprises a clamp for releasably securing the telescopic members to one another in any one of a plurality of relative positions.

12. A bracket according to claim 10, wherein at least one of the connectors comprises a key for engaging a keyway of the object.

13. A bracket according to claim 10, wherein at least one of the connectors comprises a plate with an array of holes each for connection with an edge or corner of the object.

14. A clamp for use in a bracket for mounting an object to a profiled beam, the clamp comprising a pair of opposed clamp members, a tether joining the clamp members and a fastener for fastening the clamp members, wherein the clamp members describe opposed beam receiving recesses, each clamp member has a retaining feature for engaging a first side of a profiled beam, the tether joins the clamp members on the first side of the beam and the fastener is operable to fasten the clamp members on a second side of the beam, opposite the first side, while the retaining features engage the first side of the beam.

15. A clamp according to claim 14, wherein each retaining feature comprises a retaining lip which projects inwardly from the clamp member for engaging a lip or recess of the profiled beam.

16. A clamp according to claim 15, wherein the fastener comprises a latch operable to latch the clamp members together.

17. A clamp according to claim 16, wherein the latch comprises a twist lock latch which releasably connects the clamp members together.

18. A clamp according to claim 14, wherein the tether is configured to support the clamp members in a spaced, beam receiving configuration and is resilient to enable the clamp members to be moved relative to one another.

19. A clamp according to claim 18, wherein the tether comprises a sprung hinge.

20. A clamp according to claim 14, wherein each clamp member comprises a mounting bracket for connecting an extendable support thereto.

\* \* \* \* \*